May 28, 1957 — H. M. GEYER — 2,793,503
ACTUATOR SYSTEM
Filed Aug. 31, 1953 — 4 Sheets-Sheet 1

INVENTOR.
Howard M. Geyer
BY
*Craig V. Morton*
Attorney

May 28, 1957  H. M. GEYER  2,793,503
ACTUATOR SYSTEM
Filed Aug. 31, 1953  4 Sheets-Sheet 2
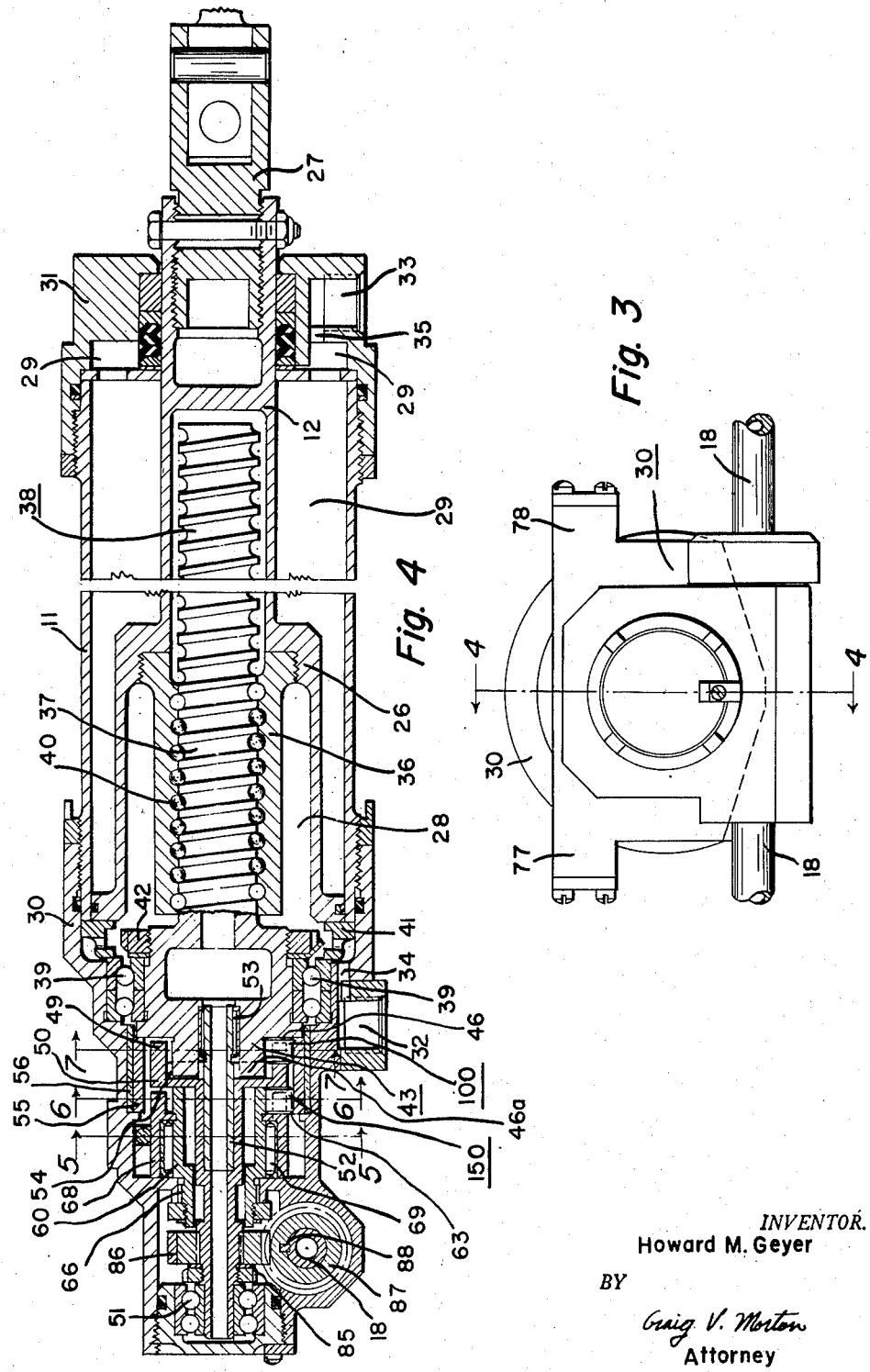
INVENTOR.
Howard M. Geyer
BY
*Craig V. Morton*
Attorney

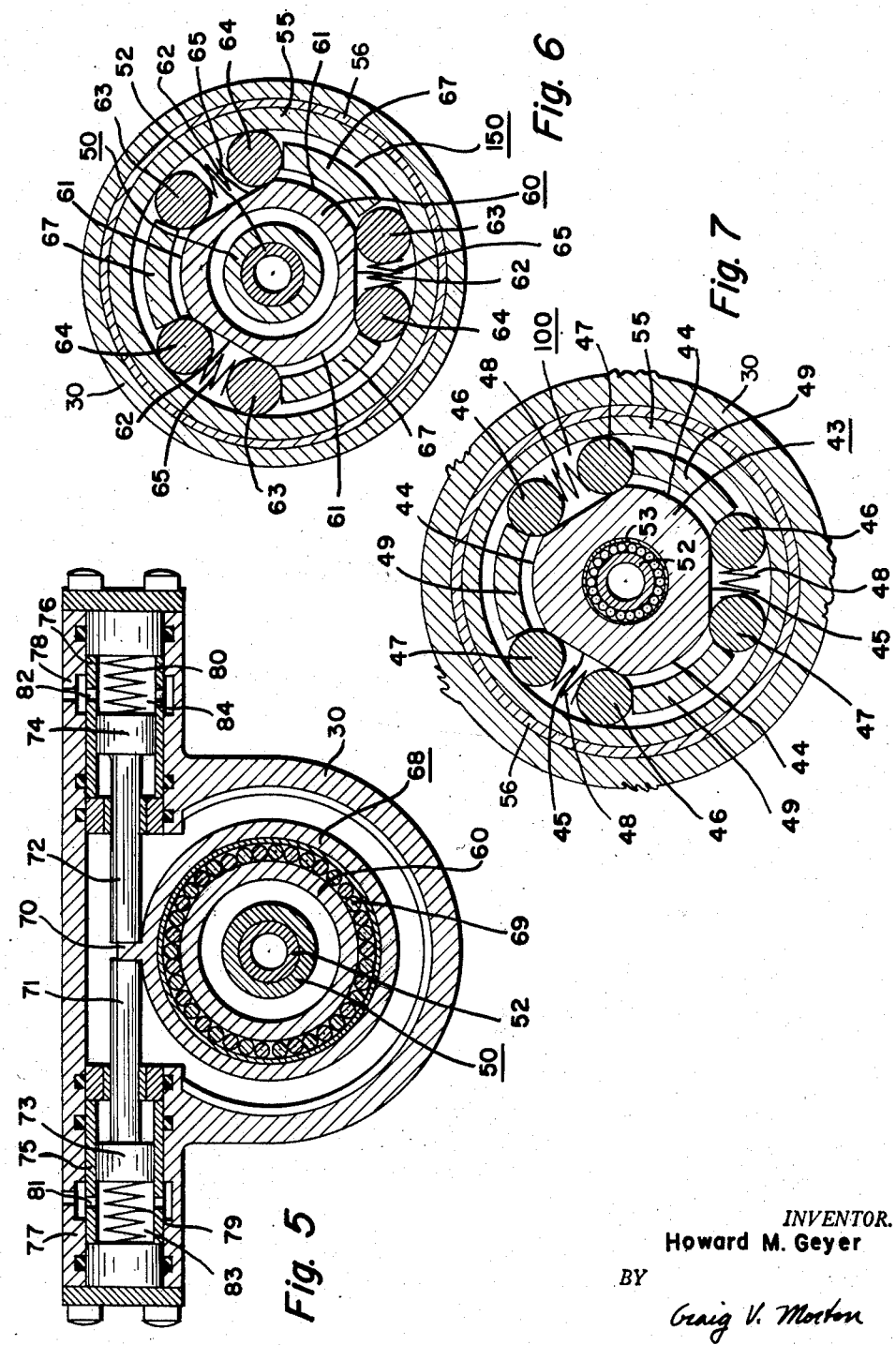

May 28, 1957  H. M. GEYER  2,793,503
ACTUATOR SYSTEM
Filed Aug. 31, 1953  4 Sheets-Sheet 4
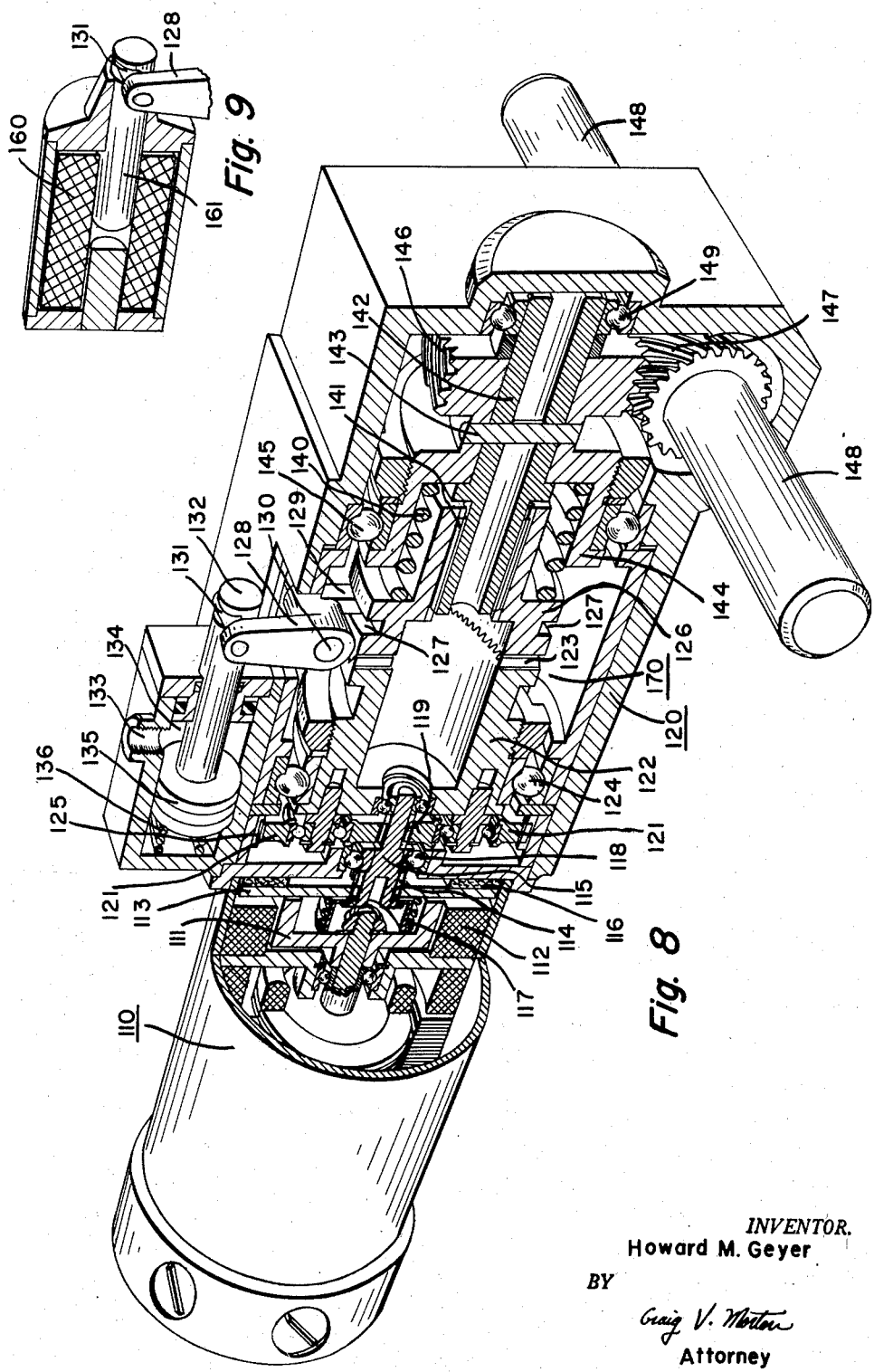
INVENTOR.
Howard M. Geyer
BY
Craig V. Morton
Attorney United States Patent Office 2,793,503
Patented May 28, 1957

2,793,503

ACTUATOR SYSTEM

Howard M. Geyer, Dayton, Ohio, assignor to General Motors Corporation, Detroit, Mich., a corporation of Delaware Application August 31, 1953, Serial No. 377,533

19 Claims. (Cl. 60—97)

This invention pertains to actuators and the operation thereof, and more particularly to means for interconnecting a plurality of fluid pressure operated actuators so as to synchronize their operation and for effecting synchronized movement thereof in lieu of fluid pressure actuation.

Heretofore, linear actuators of the electric motor driven type, or electro-mechanical actuators, have been interconnected by power transmitting means so as to synchronize their operation, and in addition, to provide for operation of more than one actuator in the system by a single electric motor if the motors of one or more actuators should be rendered inoperative for any reason. However, these systems are not adapted to be used in conjunction with fluid pressure operated, self-locking actuators to which this invention appertains. In the interconnection of actuators of the latter type, cognizance must be taken of the fact that in the event of failure of the fluid pressure actuating system, the self-locking means become operative and the auxiliary motivating means, or electric motor, must be so connected with the several actuators so as to effect movement thereof with the locking means in the operative, or locked, position. Accordingly, among my objects are the provision of a self-locking, fluid pressure operated actuator including means for interconnecting it with other like actuators so as to effect synchronous operation of all actuators in the system; the further provision of means for interconnecting a plurality of self-locking actuators so that one actuator is capable of mechanically driving another actuator in the event the locking means of the other actuator fail to release during fluid pressure actuation; and the still further provision of means for effecting synchronous operation of a plurality of self-locking actuators in lieu of fluid pressure actuation.

The aforementioned and other objects are accomplished in the present invention by providing an actuator construction embodying a pair of serially arranged roller-locks, or locking means, for controlling the movement of a rotatable member in a linear actuator. Specifically, each actuator includes a cylinder having disposed therein a piston. The piston carries an internally threaded member, which is restrained against rotation. The internally threaded member constitutes the nut of the well known ball-screw and nut combination. The internally threaded member engages an externally threaded member through the medium of a plurality of circulating balls, the externally threaded member being rotatably supported within the cylinder. The piston includes a longitudinally extending rod portion, which projects through an end wall of the cylinder and is adapted for connection to a relatively movable load device, or to a support, that precludes rotation of the piston relative to the cylinder. However, it is manifest that relative linear movement between the cylinder and the piston results in, and is dependent upon, relative rotation between the interengaging threaded members.

The externally threaded member, or screw shaft, has a portion thereof formed as the cam member of a first roller-lock, or no-back device, embodied in the actuator. Each roller-lock includes a cam member having three flat surfaces separated by a like number of arcuate surfaces; a pair of rollers situated on each of the flats which are normally urged apart by a preloaded spring; a lock releasing member having three axially extending fingers, coaxially disposed with reference to the arcuate surfaces of the cam member; and an annular member which encompasses the rollers and the axially extending fingers. In the instant disclosure the annular member of each roller-lock is common to both roller-locks and is rotatably supported within the cylinder. The lock operator, or fingered member of the first roller-lock, is operatively connected to a gear train, which constitutes part of the power transmitting connection between adjacent actuators. This power transmitting interconnection assures synchronous operation of adjacent actuators and results in an equal division of the load therebetween. The lock operator of the first roller-lock is also connected to the cam member of the first roller-lock by a loosely fitting tongue and groove connection.

The second roller-lock constitutes the means for locking the actuator so as to prevent piston movement in the absence of fluid pressure application to the cylinder. Thus, the cam member of the second roller-lock is fixedly attached to the actuator cylinder, while the fingered member, or lock operator, which constitutes the lock releasing means, is rotatably supported within the cylinder and adapted for limited angular movement in a manner to be described. The fingered member of the second roller-lock is operatively associated with a pair of spring biased, fluid pressure operated lock release pistons, which are actuated to partially release the second roller-lock and permit rotation of the screw shaft in either direction dependent upon, and concurrently with, the application of pressure fluid to either of the actuator chambers. The roller-locks may conveniently be termed "no-back" devices inasmuch as they can only be partially released to permit rotation of the screw shaft in one direction at a time. Thus, when fluid under pressure is applied to one of the actuator chambers, the lock operator of the second roller-lock is moved so as to permit rotation of the screw shaft through the engaged first roller-lock in one direction so as to facilitate relative linear movement between the cylinder and the piston in one direction, while precluding rotation of the screw shaft, and consequent relative linear movement between the piston and the cylinder, in the other direction. As relative linear movement between the cylinder and the piston is dependent upon and effects rotation of the screw shaft of each actuator, the power transmitting connection between adjacent actuators will result in like movement of all actuators in the system.

If the locking means of each actuator in the system are released upon the application of pressure fluid to the several actuator cylinders and lock releasing means, synchronized actuator operation will be effected. However, if the locking means of one actuator fail to release for some reason, synchronized operation of all actuators will still be effected inasmuch as the screw shafts of all actuators are interconnected, by which means the first roller-lock device of the locked actuator will be released by its cam member to permit rotation of the screw shaft free of the second roller-lock which is locked.

In some instances it may also be desirable to provide auxiliary means for operating the actuators in lieu of fluid pressure actuation. The auxiliary means may conveniently take the form of a reversible electric motor, which arrangement is comprehended by this invention. In this type of arrangement, the reversible electric motor is adapted for connection to the power transmitting means that interconnects the screw shafts of adjacent actuators so as to effect synchronized rotation of the screw shafts in the actuators with the second roller-locks in each actuator in the locked condition. Consequently, the first roller-lock of each actuator is partially released by rotating the fingered member, or lock operator, relative to the cam, which movement is permitted by the loose tongue and groove connection therebetween, so that the screw shafts are released for rotation in either direction, but not both directions.

Further objects and advantages of the present invention will be apparent from the following description, references being had to the accompanying drawings wherein a preferred embodiment of the present invention is clearly shown, and wherein like numerals denote like parts throughout the several views.

In the drawings:

Fig. 3 is an end view of an actuator constructed according to this invention, with the power transmitting interconnecting means broken away.

Fig. 4 is a sectional view taken along line 4—4 of Fig. 3.

Figs. 5, 6 and 7 are respective sectional views taken along lines 5—5, 6—6 and 7—7 of Fig. 4.

Figure 1:
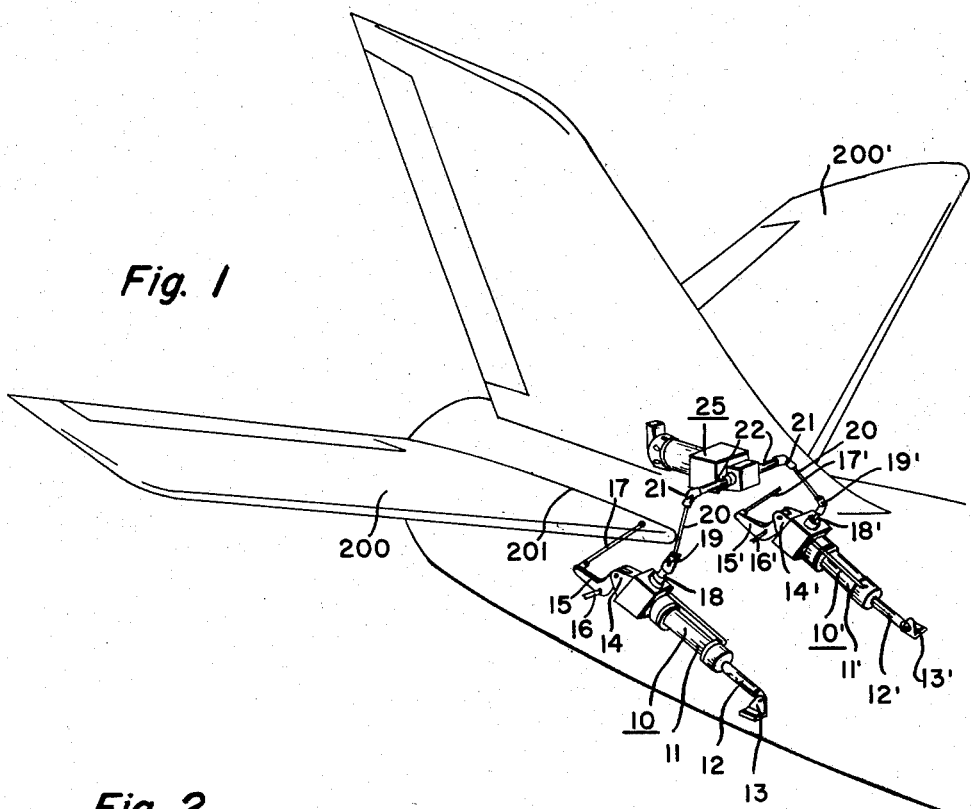
Fig. 1 is a fragmentary view, in perspective, illustrating an actuator system including auxiliary motivating means, constructed according to this invention.

Fig. 8 is a perspective view, partly in section and partly in elevation, depicting the auxiliary motivating means of Fig. 1.

Fig. 9 is a perspective view, partly in section and partly in elevation, depicting a modified clutch operator for the auxiliary motivating means of Fig. 8.

With particular reference to Fig. 1, a multiple actuator installation, or system, is shown comprising a pair of fluid pressure operated actuators 10 and 10' of identical construction. Accordingly, like parts of the actuator 10' will be denoted by like numerals indicating the parts of actuator 10, with primes affixed. The actuators 10 and 10' are illustrated in conjunction with a pivotally movable tail assembly comprising sections 200 and 200' of an aircraft. The tail section 200 is pivotally mounted at 201 to the fuselage of the aircraft, and the tail section 200' is pivotally mounted in a similar manner, which is not shown. The actuator 10 includes a cylinder 11 within which is disposed a piston having a longitudinally extending rod portion 12, the free end of which is attached to the aircraft fuselage at 13. The actuators 10 and 10' are of the linear type, and, hence, during operation, relative linear movement occurs between the cylinder and the piston. In the installation shown in Fig. 1, the piston is fixed and, accordingly, the cylinder will be moved during operation of the actuator. One end of the cylinder 11 is provided with a fixture 14, to which one end of a bell crank 15 is pivotally connected. The intermediate portion of the bell crank 15 is pivoted by a shaft 16 to the aircraft fuselage, while the other end of bell crank 15 is connected by a link 17 to the tail flap 200.

Each actuator, as will be described hereinafter, includes an externally threaded member which is interconnected with the actuator piston so as to rotate upon relative linear movement between the cylinder and piston. The threaded members of each actuator are operatively connected to an extending shaft 18, and the shafts 18 and 18' of adjacent actuators 10 and 10' are connected by a linkage comprising universal joints 19 and 19', shafts 20 and 20', universal joints 21 and 21', and a shaft 22. This power transmitting interconnection between adjacent actuators results in synchronized operation of the actuators, and an equal division of the load therebetween. As is shown in Fig. 1, auxiliary motivating means 25 may be associated with the shaft 22 for effecting rotation thereof in lieu of fluid pressure operation of the actuators 10 and 10'. The specific construction and arrangement of the auxiliary motivating means will be more fully described hereinafter.

Figure 2:
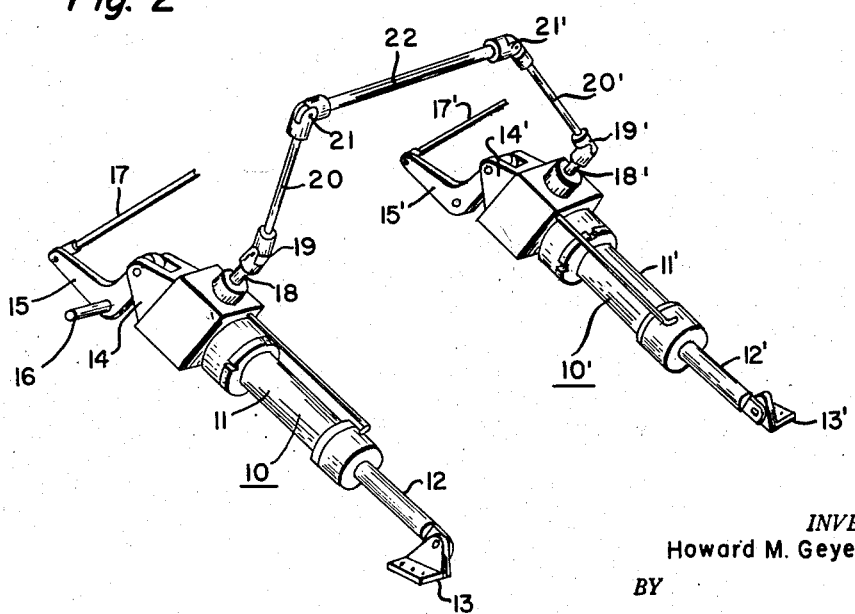
Fig. 2 is a view, in perspective, of an actuator system without the auxiliary motivating means of Fig. 1.

With reference to Fig. 2, an arrangement is shown wherein the pair of fluid pressure operated actuators 10 and 10' are interconnected by power transmitting means, without provision being made for the auxiliary motivating means 25 of Fig. 1. In all other respects the actuator system of Fig. 2 is similar to that heretofore described in connection with Fig. 1, it being understood that either the cylinders or the piston rods may be connected to the bell cranks to suit the particular exigencies in use.

With particular reference to Figs. 3 and 4, the construction of an actuator employed in the actuator systems in Figs. 1 and 2 will next be described, it being understood that each of the several actuators in the installation are of identical construction. The actuator includes a cylinder 11 having threaded portions adjacent each end thereof, which receive end caps 30 and 31, respectively. A piston 26 is mounted for reciprocable movement relative to the cylinder 11 under the urge of fluid pressure, it being understood that by reciprocable movement of the piston, I mean movement of the piston relative to the cylinder 11. That is, if the cylinder is fixed, the piston is movable and, conversely, if the piston is fixed, the cylinder is movable. The piston 26 divides the cylinder 11 into an extend chamber 28 and a retract chamber 29. Head cap 30 includes a port opening 32, which communicates through passage means 34 with the extend chamber 28, and the tail cap 31 includes a port 33, which communicates with a retract chamber 29 through a passage 35.

The piston 26 includes an integral, recessed piston rod 12, which extends through and sealingly engages an opening in the tail cap 31. The free end of the piston rod 12 is provided with a fixture 27 by which it may be attached to either a relatively movable load device, or, as shown in Figs. 1 and 2, to a supporting bracket. In either event, the connection with piston rod 12 prevents rotation of the piston 26 relative to the cylinder 11. The piston 26 carries a hollow member 36, which is restrained against rotation relative to the piston. The hollow member 36 has a spirally grooved interior surface 37 and constitutes a component of the well known ball-screw and nut combination. A screw shaft, or externally threaded member 38, is rotatably journaled by bearing means 39 within head cap 30, the screw shaft having a complementary spiral grooved portion, which threadedly engages the spirally grooved portion 37 of the nut 36 through the medium of a plurality of circulating balls 40. The balls circulate within the nut 36 through suitable passage means, not shown.

The outer races of the bearing means 39 for rotatably journaling the screw shaft 38, are retained in position between an integral interior shoulder of the head cap 30 and an annular member 41. The inner races of the bearing means 39 are retained between an integral shoulder on the screw shaft 38 and a nut 42, which threadedly engages a portion of the screw shaft.

With particular reference to Figs. 4 and 7, it may be seen that one end of the screw shaft 38 is formed as a cam member 43 having three arcuate portions 44 separated by three flats 45. In addition, the cam member 43 is formed with an axially extending tongue portion 46a, the purpose of which will be described hereinafter. The cam member 43 forms one part of a first roller-lock, or no-back device, designated generally by the numeral 100, constituting a means for locking the screw shaft 38 against rotation. The actuator also includes a second roller-lock, or no-back device, designated generally by the numeral 150.

The first roller-lock 100 includes, in addition to the cam member 43, three sets of rollers, each including a pair of rollers 46 and 47 disposed on the flats 45 of the cam 43 and urged apart by a preloaded spring 48. The three arcuate surfaces 44 of the cam member 43 are encompassed by concentric fingers 49 of a clutch operator 50 for the first roller-lock 100. With particular reference to Fig. 4, it may be seen that the lock operator 50 comprises a member having the three axially extending fingers 49, the remote end of the member 50 being rotatably supported by bearing means 51 within the head cap 30. A hollow portion of the member 50 has attached thereto a tubular sleeve 52, which is journaled by roller bearing means 53 within the cam member 43, which is integral with the screw shaft 38. The projecting tongue 46a of the cam member 43 is loosely received within a diametrically extending groove 54 of the clutch operator 50 so as to permit limited angular movement of the member 50 relative to the cam 43 for a reason which will appear more fully hereinafter. The roller-lock 100 also includes an annular member 55 which encompasses and is coaxially disposed with regard to the lock operator 50 and the arcuate surfaces 44 of the cam member 43, and against which the springs 48 urge the rollers 46 and 47 into wedging engagement. As is seen in Fig. 4, the annular member 55 is rotatably journaled within the head cap 30 by a sleeve bearing 56.

The second roller-lock, or no-back device, constitutes another means for locking the actuator piston 26 against movement relative to the cylinder 11, by restraining rotation of the screw shaft 38. The second roller-lock includes a hollow cam member 60, through which the sleeve 52 and the tubular portion of member 50 extend. In a like manner, the cam 60 includes three arcuate surfaces 61 separated by three flats 62. Similarly, three sets of rollers, each including a pair of rollers 63 and 64 are situated on the flats and urged apart by preloaded springs 65. In this instance, the cam member 60 is splinedly connected at 66 to the head cap 30 so that relative rotation therebetween is prevented, and inasmuch as the head cap 30 is restrained against rotation by its connection with either the load device, as shown in Figs. 1 and 2, or supporting structure, the cam member 60 is stationary. The three arcuate surfaces 61 of the cam 60 are surrounded by concentrically disposed fingers 67, which project axially from the lock operator 68 of the second roller-lock 150. The fingers 67 and the sets of rollers 63 and 64, are, in turn, encompassed by the annular member 55, which is common to both roller-locks.

With particular reference to Figs. 4 and 5, it may be seen that the lock operator 68 of the roller-lock 150 is rotatably journaled by roller bearing means 69 on the stationary cam member 60. In addition, the lock operator 68 is provided with a radially extending tang 70, opposite sides of which are engaged by a pair of piston rods 71 and 72 attached to pistons 73 and 74, respectively. The piston 73 is disposed for reciprocable movement within a cylinder sleeve 75 disposed within a cylinder casing 77 formed as an integral part of the head cap 30. A compression spring 79 normally urges the piston 73 and the rod 71 to the right, as viewed in Fig. 5, and into engagement with the tang 70 of the lock operator 68. The cylinder sleeve 75 is provided with a port opening 81 through which fluid under pressure may be admitted to the chamber 83. Similarly, the piston 74 is mounted for reciprocable movement within the cylinder sleeve 76 disposed within a cylinder housing 78 formed as an integral part of the head cap 30. Likewise a spring 80 engages the piston 74 and normally urges the rod portion 72 into engagement with the tang 70. Thus, the springs 79 and 80 normally maintain roller-lock 150 in the locked condition. The cylinder sleeve 76 is also provided with a port opening 82, through which fluid under pressure may be admitted to the chamber 84. Port 81 is connected by any suitable conduit, not shown, to the extend port 32 of the actuator cylinder 11, while port 82 is connected by any suitable conduit, not shown, to the retract port 33, the ports 32 and 33, in turn, being connected to the outlet ports of a four-way valve, not shown, which has a supply port connected to any suitable source of fluid pressure, likewise not shown.

Referring again to Fig. 4, it may be seen that the lock operator 50 has a straight spline portion 85, which receives a helical gear 86. Helical gear 86 meshes with a second helical gear 87, which is keyed at 88 to the hollow shaft 18. The shaft 18 constitutes the power transmitting interconnecting means between adjacent actuators, and as is shown in Fig. 3, the shaft 18 may extend transversely of the actuator cylinder in both directions for connection with the helical gears of adjacent actuators. However, as is shown in the actuator installation of Figs. 1 and 2, the shaft 18 extends in only one direction inasmuch as only two actuators are employed. The shaft 18 is rotatably supported within the tail cap 30 by any suitable bearing means, not shown, which bearing means also prevent axial movement of the shaft 18 relative to the head cap 30. It is to be understood that the multiple actuator installation depicted in Figs. 1 and 2 is only shown by way of example and is not to be construed in any way as limiting the scope of this invention.

The operation of the self-locking, fluid pressure operated actuator, shown in Fig. 4, will next be described. Referring to Figs. 4 through 6, when the control valve, not shown, is actuated so as to call for an extension of the actuator, fluid under pressure will be concurrently supplied to the extend actuator port 32 and port 81 of the lock releasing means. In this instance the control valve is of such a nature that in the neutral position, both actuator ports 32 and 33 are connected to drain, as well as lock releasing ports 81 and 82. Accordingly, upon the application of pressure to the extend chamber 28 and concurrently therewith, the application of pressure to chamber 83 of cylinder 75, the piston 73 will be moved to the right, as viewed in Fig. 5, thereby effecting clockwise movement of the lock operator 68, as viewed in Figs. 5 and 6. Piston 73 in moving to the right will move piston 74 to the right and compress spring 80 since at this time, port 32 and the retract port 33 are connected to drain.

When the fingers 67 of the lock operator 68 are rotated a small angular distance in the clockwise direction, as viewed in Fig. 6, the rollers 63 are moved towards the rollers 64 by compressing the springs 65, thereby freeing the annular member 55 for rotation relative to the cam member 60 in a counterclockwise direction. Thus, the roller-lock 150 is partially released to permit counterclockwise rotation of the annular member 55, while still preventing clockwise movement of the annular member 55, since counterclockwise rotation of the member 55 will tend to move the rollers out of wedging engagement therewith, while clockwise movement of the member 55 will move the rollers 64 into wedging engagement between the cam 60 and the member 55. Thus, when fluid under pressure is applied to the extend chamber 28, the piston 26 will move to the right relative to the cylinder, as viewed in Fig. 4, thereby effecting rotation of the screw shaft 38 relative to the nut 36, which rotation is transmitted through the engaged roller-lock 100 to the member 50, which, in turn, will rotate helical gear 86. Rotation of helical gear 86 will, in turn, effect rotation of helical gear 87 and the interconnecting shaft 18.

When the actuator has been extended the desired amount and the control valve, not shown, is moved to its neutral position, ports 81 and 32 will be connected to drain, thereby permitting the spring 80 within the cylinder 76 to move the piston 74 to the left, as viewed in Fig. 5, until the pistons 73 and 74 assume the positions they are shown in Fig. 5. At this time, the lock operator 68 will be positioned by springs 79 and 80 so that fingers 67 are in the position shown in Fig. 6 wherein the roller-lock 150 is locked, thereby preventing rotation of the annular member 55 in both directions. It will be appreciated that inasmuch as annular member 55 is restrained against rotation, the screw shaft through the locked roller-lock 100 will, likewise, be restrained against rotation. Conversely, if the operator desires to retract the actuator, fluid under pressure is simultaneously admitted to ports 33 and 82, while ports 32 and 81 are connected to drain, thereby effecting counterclockwise movement of the lock operator 68, as viewed in Fig. 5, so that fingers 67 move the rollers 64 towards the rollers 63 and permit clockwise movement of the annular member 55. The roller-lock 150 may be considered a no-back device inasmuch as it will only permit rotation of the screw shaft 38 in the direction selected by manipulation of the control valve, not shown. Accordingly, should the force of the load to which the actuator is connected, instantaneously exceed the force exerted against the piston in opposing the load, the load will be unable to move the actuator piston in a backward direction.

Now considering that a pair of actuators 10 and 10', as are shown in Fig. 2, have their synchronizing shafts 18 and 18' interconnected through universal joints 19 and 19', shafts 20 and 20', universal joints 21 and 21' and shaft 22, and the extend and retract ports of each actuator cylinder are interconnected with a single control valve, not shown, synchronized operation of the actuators will be accomplished as follows. When fluid under pressure is applied to either the retract or extend ports of the actuators 10 and 10', and the locking means, constituted by the roller-locks 150 of each actuator are partially released, rotation of the screw shafts of adjacent actuators in response to relative linear movement between the actuator cylinders and the actuator pistons will effect rotation of the shafts 18 and 18', which are interconnected. Accordingly, the adjacent actuators 10 and 10' will move in synchronism and the load imposed upon the actuators 10 and 10' will be equally divided therebetween.

Now supposing that the locking means constituted by the roller-lock 150 of the actuator 10 fails to release while the locking means of actuator 10' do release, upon the application of fluid pressure to the actuators 10 and 10', in this instance, the roller clutch 150 in actuator 10 will be in the locked position, as represented by Figure 6, while the corresponding roller-clutch of the actuator 10' will be in the partially released position. Accordingly, the application of fluid pressure to one of the chambers of actuator 10' will effect linear movement thereof, while the application of pressure to one of the chambers of actuator 10 will not effect linear movement thereof since the screw shaft is locked against rotation. However, actuators 10 and 10' will still move their respective loads in synchronism inasmuch as their screw shaft are interconnected. Thus, linear movement of the piston in actuator 10' will result in rotation of its screw shaft, which will be transmitted through shaft 18', universal joint 19', shaft 20', universal joint 21', shaft 22, universal joint 21, shaft 20, universal joint 19, and shaft 18 to the screw shaft 38 of actuator 10. Inasmuch as the roller lock 150 is in the locked position, as shown in Fig. 6, the annular member 55 will be restrained against rotation in both directions. However, by reason of the loose tongue and groove connection between the lock operator 50 of the roller-lock 100 and the cam member 43, the fingers 49 will be rotated throughout a small angular distance in one direction, say for instance, the clockwise direction, thereby moving rollers 46 towards rollers 47 and compressing the springs 48. Accordingly, the cam member 43 is freed for rotation in the clockwise direction, as viewed in Fig. 7, thereby permitting rotation of the screw shaft 38 in synchronism with the screw shaft of actuator 10'. Thus, fluid pressure operation of actuator 10' will mechanically drive the screw shaft 38 and, thus, mechanically operate actuator 10 in synchronism therewith.

Referring to Figs. 1 and 8, the auxiliary motivating means, which may be incorporated in the installation, as shown in Fig. 1, will next be described. The auxiliary motivating means comprise a reversible electric motor 110, the shaft of which is rotatably connected to a cup-shaped magnetic member 111. The cup-shaped magnetic member 111 constitutes an element of an electromagnetic clutch of the type disclosed in Patent No. 2,620,683. An electromagnetic winding 112 is employed to magnetize the member 111 so as to attract a magnetic disc 113, which is connected through straight splines 114 to a shaft 115. Magnetic disc 113 is normally urged against stationary friction surface 116 by means of a compression spring 117, such that when the electric motor 110 and the electromagnetic winding 112 is deenergized, the shaft 115 is restrained against rotation. However, upon energization of the electric motor 110, the winding 112 is energized, thereby establishing a magnetic field which attracts the disc 113 towards the cup-shaped member 111, axial movement of the disc 113 being permitted by the straight splines 114, so that the disc 113 and the shaft 115 will be rotated with the motor driven member 111.

Stub shaft 115 is supported for rotation by bearing means 118 within a clutch housing 120. The stub shaft 118 has formed integral therewith a gear portion 119 which constitutes the sun gear of a planetary gear set. The planet pinions 121 of the planetary gear set are carried by a spider 122 having a radially serrated, or notched, end portion 123. The spider 122 is supported for rotation within the housing 120 by bearing means 124, and the reaction gear 125 of the planetary gear set is attached to the housing 120 and, accordingly, is stationary. The serrated end portion 123 of the spider 122 constitutes one member of a dog tooth type clutch designated generally by the numeral 170, the other member of which is designated by the numeral 126. Member 126 is provided with an annular groove 127 within which the end 129 of a pivoted lever 128 is situated. The other end of the lever 128, which is pivoted at 130 to the housing 120, is provided with a laterally extending pin 131, which is received in a transverse groove of a piston rod 132.

Clutch member 126 is normally urged into engagement with the toothed surface of the spider 122 by means of a compression spring 140. The clutch member 126 is connected through straight splines 141 with a shaft 142, the shaft 142, in turn, being connected by a cross pin 143 to a cup-shaped member 144, which receives the spring 140 and is rotatably journaled in the housing 120 by bearing means 145. The straight spline connection 141 between the clutch member 126 and the shaft 142 permits relative axial movement therebetween while precluding relative rotation therebetween. The cup-shaped member 144 is formed integral with a helical gear 146, which meshes with a second helical gear 147 carried by a shaft 148, which may be connected to the shaft 22 of the installation shown in Fig. 1. The shaft 142 is rotatably journaled in the housing 120 by bearing means 149.

In order to release the dog toothed clutch 170 constituted by members 122 and 126, fluid under pressure is admitted through a port 133 to a cylinder 134 having disposed therein a piston 135. Piston 135 is connected to the rod 132 within which the pin 131 is received. As shown in Fig. 8, the piston 135 is normally urged to the right by means of a compression spring 136, such that in the absence of fluid pressure application to the cylinder 134, the spring 136 will assist the spring 140 in engaging the dog toothed clutch. In the actual installation, the port 133 is connected to the source of fluid pressure, not shown, such that at all times when the fluid pressure source is operative and is of a predetermined pressure potential, the dog toothed clutch constituted by members 122 and 126 will be disengaged, thereby permitting rotation of the shaft 148 free of the member 122. However, should the fluid pressure source fail, the combined effects of springs 136 and 140 will move the dog toothed clutch members into engagement.

As is shown in Fig. 9, an alternative means for controlling the engagement of the dog toothed clutch may comprise a solenoid 160 and a cooperable plunger 161. The plunger 161 has a transversely extending slot within which the pin 131 of the lever 128 is received, the construction and arrangement being such that upon energization of the solenoid winding 160, the solenoid plunger 161 will move to the left, as viewed in Fig. 9, thereby effecting pivotal movement of the lever 128 so as to disengage the dog toothed clutch of Fig. 8. Thus, the solenoid winding 160 may be energized by a circuit, which is closed whenever the fluid pressure system for operating the actuators is maintained at a suitable pressure potential, or by a circuit independent of the fluid pressure system, not shown.

The operation of the multiple actuator installation, shown in Fig. 1, including the auxiliary motivating means will now be described. Suffice it to say that fluid pressure operation of the actuators 10 and 10' will be the same as that heretofore described in connection with the installation of Fig. 2, inasmuch as the dog toothed clutch 170 is disengaged. However, should the fluid pressure system fail, the dog toothed clutch 170 will be engaged by the spring 140, since fluid under pressure is no longer applied to the cylinder 134 of Fig. 8, or the solenoid winding 160 is not energized in Fig. 9. Thus, the dog toothed clutch 170 is placed in operative condition to transmit rotation between the spider 122 and the shaft 142 to thereby operate the actuators 10 and 10' in synchronism. Accordingly, when the electric motor 110 is energized, to thereby simultaneously energize electromagnetic winding 112, the electric motor 110 may be rotated in either direction, which rotation will be transmitted through the magnetic clutch constituted by members 111 and 113 to the shaft 115. Accordingly, rotation will be transmitted from the sun gear 119 through the planet pinions 121 to the spider 122 and, thence, through the engaged dog toothed clutch 170 to the shaft 142 and the gear 146. Accordingly, rotation will be imparted to the shaft 148 and, thence, to the rotatable screw shafts of adjacent actuators through the interconnecting means described hereinbefore. In this instance the fluid pressure releasable roller-lock, or locking means, of each actuator will be in the locked condition, due to the absence of fluid pressure in the lock releasing cylinders 75 and 76 and, accordingly, the annular members of the roller-clutches will be restrained against rotation. However, due to the loose tongue and groove connection between the cam and the clutch operator of the second roller-lock, or locking means, in each actuator, the second roller-locks will be partially released to permit rotation of the cams thereof and the screw shafts in either direction, but not in both directions, thereby permitting rotation of the screw shafts and reciprocable movement of the actuator pistons.

From the foregoing it is manifest that the present invention provides an actuator construction of the self-locking, fluid pressure operated type which readily lends itself to being connected with other like actuators for synchronized operation. Moreover, inasmuch as the actuators include members which are rotated in response to linear piston movement, the power transmitting connection between adjacent actuators is greatly simplified. Moreover, the actuators of this invention can be merely interconnected so that if the locking means of one or more actuators, but not all, fail to release, all actuators in the multiple actuator installation may nevertheless be operated in synchronism due to the serially arranged roller-clutches embodied in each actuator. Moreover, the actuators may be operated in synchronism by auxiliary motivating means, such as an electric motor, should the fluid pressure system for operating the actuators fail.

While the embodiment of the present invention as herein disclosed, constitutes a preferred form, it is to be understood that other forms might be adopted.

What is claimed is as follows:

1. In combination with a plurality of actuators each comprising a cylinder and a piston disposed in the cylinder, said piston and said cylinder being arranged for reciprocable movement relative to each other in either direction by application of fluid pressure to said cylinder, a member rotatably supported within the cylinder and reversibly connected to the piston such that said member will rotate in response to relative movement between the cylinder and the piston, releasable locking means operatively associated with said member and normally operative to prevent rotation of said member and consequent relative movement between said cylinder and said piston in the absence of fluid pressure application to said cylinder, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

2. In combination with a plurality of actuators each comprising a cylinder and a piston disposed in the cylinder, said piston and said cylinder being arranged for reciprocable movement relative to each other in either direction by application of fluid pressure to said cylinder, a member rotatably supported within the cylinder and reversibly connected to the piston such that said member will rotate in response to relative movement between said cylinder and said piston, locking means operatively associated with said rotatable member normally operative to prevent rotation of said member and consequent relative movement between said cylinder and said piston, means operatively associated with said locking means and operable to release said locking means to permit rotation of said member and relative movement between said cylinder and said piston upon application of fluid pressure to said cylinder, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

3. In combination with a plurality of actuators each comprising a cylinder and a piston disposed in the cylinder, said piston and said cylinder being arranged for reciprocable movement relative to each other in either direction by application of fluid pressure to said cylinder, a member rotatably supported within said cylinder and reversibly connected to said piston, the operative connection between said piston and said member including an element rigidly connected to said piston, said element having operative engagement with said rotatable member such that relative rotation will occur between said element and said member upon relative movement between said cylinder and said piston, releasable locking means operatively associated with said member normally operative to prevent rotation of said member and consequent relative movement between said cylinder and said piston in the absence of fluid pressure application to said cylinder, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

4. In combination with a plurality of actuators each comprising a cylinder and a piston disposed in the cylinder, said piston and said cylinder being arranged for reciprocable movement relative to each other in either direction by application of fluid pressure to said cylinder, a member rotatably supported within the cylinder and reversibly connected to the piston, the operative connection between the piston and the member including an element rigidly connected to said piston, said element having operative engagement with said member such that relative rotation will occur between said element and said member upon relative movement between said cylinder and said piston, locking means operatively associated with said member for preventing rotation thereof, means operatively associated with said locking means and operable to release said locking means to permit rotation of said member and relative movement between said cylinder and said piston upon application of fluid pressure to said cylinder, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

5. A multiple actuator system including in combination, a plurality of linear actuators each adapted for connection at one end to a relatively fixed support and at the other end to a relatively movable load device, each actuator including a cylinder having disposed therein a piston, said piston and said cylinder being arranged for reciprocable movement relative to each other in either direction by application of fluid pressure to said cylinder, means interconnecting the actuator pistons for effecting synchronous operation of said actuators, said means including a rotatable member in each cylinder reversibly connected to the piston in each cylinder so that said member will rotate in response to relative movement between its respective cylinder and piston, releasable locking means operatively associated with the rotatable member of each actuator and normally operable to prevent rotation of the rotatable member of each actuator in the absence of fluid pressure application to its respective actuator cylinder, means interconnecting the rotatable members of said actuators, and auxiliary means operatively associated with said interconnecting means and capable of effecting rotation of said members in either direction so as to effect synchronous operation of said actuators in lieu of fluid pressure operation.

6. A fluid pressure operated, actuator designed for synchronous operation with other like actuators, comprising in combination, a cylinder, a piston disposed in said cylinder, said piston and said cylinder being arranged for reciprocable movement relative to each other in either direction by application of fluid pressure to said cylinder, a rotatable member mounted in said cylinder and operatively connected to said piston such that said member will rotate in response to relative movement between said cylinder and said piston, first locking means operatively associated with said member for normally preventing rotation thereof, means operatively associated with said first locking means and operable to release said first locking means so as to free said member for rotation and permit relative movement between said cylinder and said piston, second locking means operatively associated with said member and with said first locking means, said second locking means permitting rotation of said member in the locked condition when the first locking means are released but preventing rotation of said member when the first and the second locking means are in the locked condition, and means operatively associated with said second locking means and operable to release said second locking means so as to free the member for rotation independent of and with the first locking means in the locked condition.

7. In combination with a plurality of actuators each comprising a cylinder and a piston disposed in the cylinder, said piston and said cylinder being arranged for reciprocable movement relative to each other in either direction by application of fluid pressure to said cylinder, a member rotatably supported within the cylinder and reversibly connected to the piston such that said member will rotate in response to relative movement between said cylinder and said piston, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

8. In combination with a plurality of actuators each comprising a cylinder and a piston disposed in the cylinder, said piston and said cylinder being arranged for reciprocable movement relative to each other in either direction by application of fluid pressure to said cylinder, a member rotatably supported within the cylinder and reversibly connected to the piston, the operative connection between the piston and the member including an element rigidly connected to said piston, said element having operative engagement with said rotatable member such that relative rotation will occur between said element and said member upon relative movement between said cylinder and said piston, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

9. In combination with a plurality of actuators each comprising a cylinder and a piston disposed in the cylinder, said piston and said cylinder being arranged for reciprocable movement relative to each other by application of fluid pressure to said cylinder, a first member rotatably supported within said cylinder, a second non-rotatable member disposed within said cylinder and reversibly engaging said first member, one of said members being constrained for linear movement upon relative movement between said piston and said cylinder such that relative rotation will occur between said members upon relative movement between said cylinder and said piston, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

10. In combination with a plurality of actuators each comprising a cylinder and a piston disposed within the cylinder, said piston and said cylinder being arranged for reciprocable movement relative to each other in either direction by application of fluid pressure to said cylinder, a hollow member disposed within said cylinder, a second member having reversible engagement with said hollow member, one of said members being rotatably supported within said cylinder, one of said members being constrained for linear movement upon relative movement between said cylinder and said piston, the construction and arrangement being such that upon relative movement between said cylinder and said piston relative rotation will occur between said members, means interconnecting the rotatable members of adjacent actuators for effecting synchronous operation thereof, and auxiliary means operatively associated with said interconnecting means for effecting rotation thereof in either direction and consequently effecting synchronous operation of the actuators in lieu of fluid pressure operation.

11. The combination set forth in claim 10 wherein the means interconnecting the rotatable members of adjacent actuators includes a rotatable shaft, and wherein the auxiliary means includes a reversible electric motor and clutch means operatively associated with said motor and said shaft for drivingly interconnecting the said motor and shaft, the construction and arrangement being such that during fluid pressure operation of the actuators the clutch means is disengaged to permit movement of the shaft free of the electric motor.

12. A fluid pressure operated actuator designed for synchronous operation with other like actuators comprising in combination, a cylinder, a piston disposed in said cylinder, said piston and said cylinder being arranged for reciprocable movement relative to each other by fluid pressure application to said cylinder, a member rotatably supported in said cylinder and operatively connected to said piston, the operative connection between said member and said piston including an element rigidly connected to said piston, said element having operative engagement with said rotatable member such that relative rotation will occur between said element and said member upon relative movement between said piston and said cylinder, first locking means operatively associated with said member for normally preventing rotation thereof in the absence of fluid pressure application to said cylinder, means operatively associated with said first locking means and operable to release said first locking means so as to free said member for rotation and permit relative movement between said piston and said cylinder, second locking means operatively associated with said member and with said first locking means, said second locking means permitting rotation of said member in the locked condition when said first locking means are released but preventing rotation of said member when said first and second locking means are in the locked condition, and means operatively associated with said second locking means and operable to release said second locking means so as to free the member for rotation independent of and with the first locking means in the locked condition.

13. The combination set forth in claim 12 wherein the first and second locking means include a common annular member operatively connected to the rotatable member of said actuator through said second locking means.

14. The combination set forth in claim 13 wherein each of said locking means includes a cam member coaxially disposed with respect to said annular member, said cam member having a plurality of flats separated by a like number of arcuate surfaces, and a pair of rollers mounted on each of said flats and urged apart by a preloaded spring and into wedging engagement with said annular member.

15. The combination set forth in claim 12 wherein the means for releasing said first recited locking means includes a spring biased, fluid pressure operated lock release piston which is constructed and arranged to be actuated upon application of pressure fluid to said actuator cylinder.

16. The combination with a plurality of fluid pressure operated actuators each including, a cylinder, a piston disposed in said cylinder, said piston and said cylinder being arranged for reciprocable movement relative to each other by fluid pressure application to said cylinder, a member rotatably supported within said cylinder and reversibly connected with said piston such that said member will rotate in response to relative movement between said piston and said cylinder, and releasable locking means operatively associated with said member and normally operative to prevent rotation of said member and consequent relative movement between said piston and said cylinder in the absence of fluid pressure application to said cylinder, of auxiliary driving means operatively connected with said locking means and said rotatable member of each actuator for effecting rotation of the member in each actuator and consequent relative movement between the piston and the cylinder of each actuator with the locking means in the locked condition.

17. The combination with a fluid pressure operated actuator including, a cylinder, a piston disposed in the cylinder, said piston and said cylinder being arranged for reciprocable movement relative to each other in either direction by application of fluid pressure to said cylinder, a member rotatably supported in said cylinder and operatively connected with said piston such that said member will rotate in response to relative movement between said piston and said cylinder, and releasable locking means operatively associated with said member and normally operative to prevent rotation of said member and consequent relative movement between said piston and said cylinder in the absence of fluid pressure application to said cylinder, said locking means comprising a first roller-lock device including an element which is operatively connected to the rotatable member through a second roller-lock device, of an auxiliary driving means operatively connectable with said second roller-lock device and operative to effect rotation of said member through said second roller-lock device with said first roller-lock device in the locked condition.

18. An actuator assembly including in combination, a cylinder, a piston disposed in said cylinder, said piston and said cylinder being arranged for reciprocable movement relative to each other, a member rotatably supported in said cylinder and operatively connected with said piston such that said member will rotate in response to relative movement between said piston and said cylinder, first locking means operatively associated with said rotatable member for preventing rotation thereof, said first locking means including a cam member connected to said cylinder, said cam member having a plurality of flats separated by a like number of arcuate surfaces, an annular member coaxial with and circumscribing said cam member, a pair of rollers mounted on each of said flats and urged apart by a preloaded spring into wedging engagement with said annular member, and means for moving said rollers out of wedging engagement with said annular member so as to permit rotation of said annular member, and second locking means operatively associated with said rotatable member and with said first locking means, said second locking means including the annular member of said first locking means, a cam connected with said rotatable member and having a plurality of flats separated by a like number of arcuate surfaces coaxially disposed with respect to said annular member, a pair of rollers mounted on each of said flats and urged apart by a preloaded spring into wedging engagement with said annular member and means for moving the last recited rollers out of wedging engagement with said annular member, the construction and arrangement being such that said second locking means permits rotation of said annular member and hence the rotatable member of said actuator in the locked condition when the first locking means are released but prevents rotation of said annular member and the rotatable member of said actuator when the first and second locking means are in the locked condition, while permitting rotation of the rotatable member of said actuator independent of said annular member with the first locking means in the locked condition when said second locking means are released.

19. The actuator assembly set forth in claim 18 wherein the means for releasing said first locking means comprises a rotatable element having a plurality of fingers disposed between the pairs of rollers of said first locking means for moving the rollers of said first locking means out of wedging engagement with said annular member so as to permit rotation of said annular member through the second locking means in the locked condition.

References Cited in the file of this patent

UNITED STATES PATENTS

| 1,469,689 | Prius | Oct. 2, 1923 |
| 2,186,113 | Laabs | Jan. 9, 1940 |
| 2,394,384 | Horstmann | Feb. 5, 1946 |
| 2,442,577 | Ashton | June 1, 1948 |
| 2,572,902 | Ashton | Oct. 30, 1951 |
| 2,698,157 | Ludeman | Dec. 28, 1954 |

FOREIGN PATENTS

| 389,980 | Italy | Nov. 24, 1941 |
| 405,361 | Italy | Aug. 9, 1943 |